May 18, 1937.  H. G. LASSEN  2,080,923
PORTABLE DISPENSER
Filed May 9, 1934  2 Sheets-Sheet 2
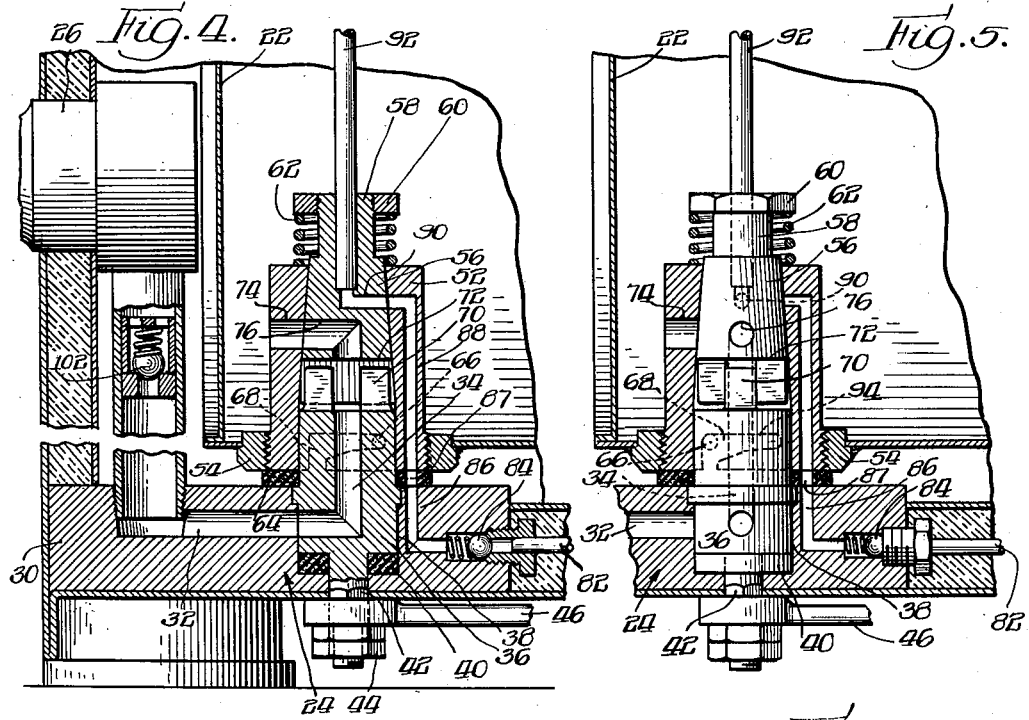
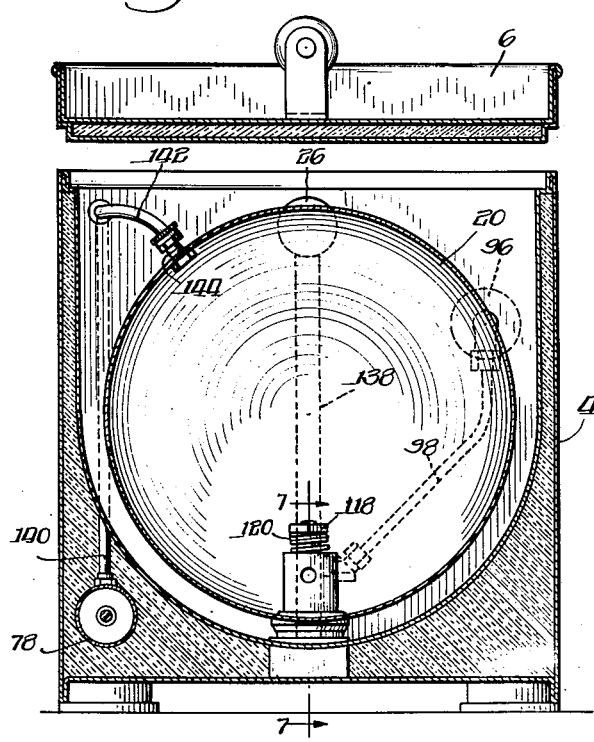
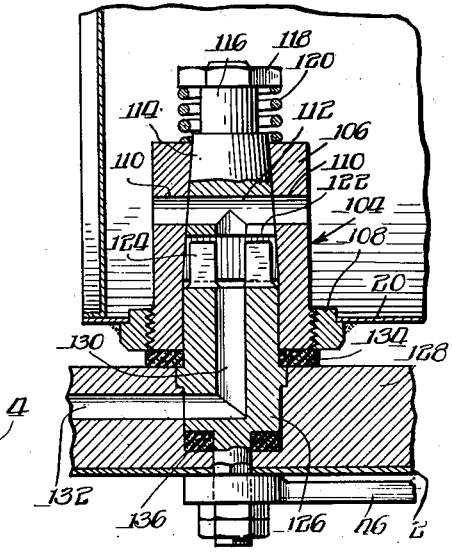
Inventor:
H. Gustav Lassen
By Wilkinson, Huxley,
Byron & Knight attys.

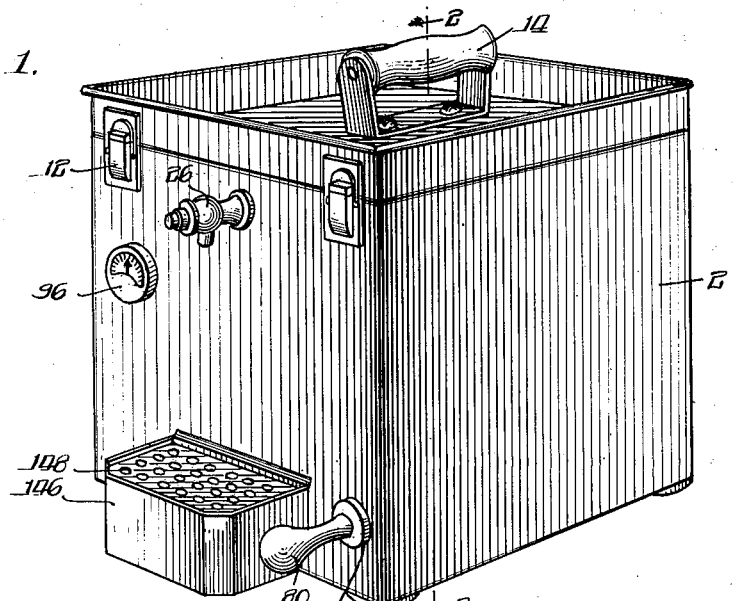
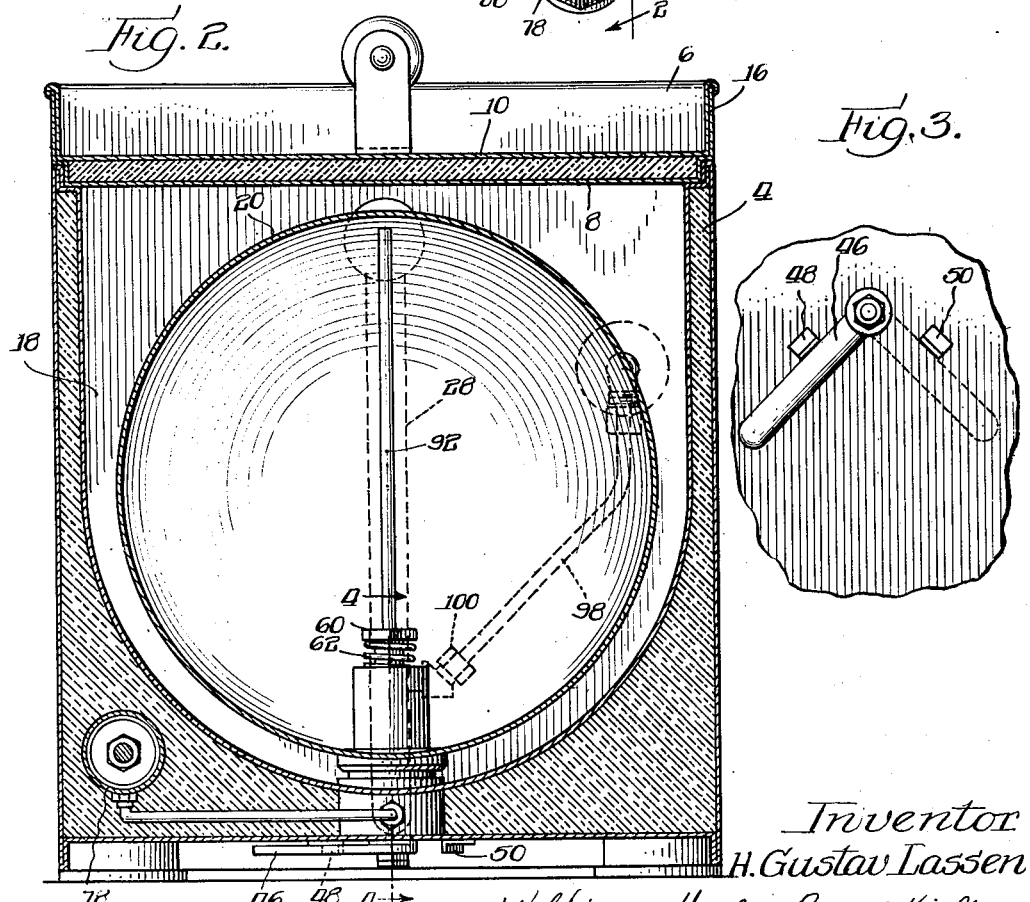

Patented May 18, 1937

2,080,923

UNITED STATES PATENT OFFICE 2,080,923

PORTABLE DISPENSER

Hans Gustav Lassen, Chicago, Ill.

Application May 9, 1934, Serial No. 724,638

18 Claims. (Cl. 225—40)

The present invention relates to dispensing devices and more in particular to portable dispensers.

Among the objects of the present invention is to provide a compact, portable dispenser adapted to be easily carried from place to place and adapted to keep a given quantity of liquid in proper condition.

It is a generally accepted fact among those who drink beer as a beverage that beer drawn from a tap is to be preferred to beer which has been bottled. One objection to bottled beer is that the same has been pasteurized, which deprives the same of a substantial amount of its original flavor.

There are times when individuals desire tap beer but because of the inconvenience and expense involved in suitable bar equipment, bottled beer is the only beverage available. It is therefore an object of the present invention to provide a suitable portable dispenser adapted to contain beer which may be drawn as desired, suitable means being provided whereby this beer can be suitably cooled. The invention further contemplates the idea of providing a suitable portable dispenser which is of the proper size and weight to be easily carried from place to place. The invention also includes the idea of providing means for cooling the same as by ice or the like, and the dispenser is of such a shape and size that it may be placed in a refrigerator ordinarily used in the household, whereby the beer or other fluid may be cooled.

A further object of the present invention is to provide a novel portable dispenser suitably insulated, and including a closure member therefor which may be used as a tray for carrying receptacles containing fluid dispensed thereby from place to place.

A portable dispenser made in accordance with the present invention includes a container for beer or other fluid to be dispensed. It is an object of the present invention to provide a device in which this container may be releasably held within an insulated casing. The present invention contemplates the idea of providing a container which may be easily and readily filled at a brewery or the like, and which may be easily conveyed to retail outlets and sold to the consuming public. When a container has been emptied, another filled container may be substituted therefor when desired.

Still another object of the present invention is to provide a novel portable dispenser which may be readily cleaned and kept in a sanitary condition.

Still another object within the purview of the present invention is to provide a dispenser including a casing and a liquid container wherein the discharge means for liquid has a valve for locking the container in position within the casing, this valve being operated exteriorly of the casing.

Still a further object of the present invention is to provide a dispenser for beer or the like comprising a liquid container disposed within an outer casing, in combination with suitable means for introducing air above the liquid in the container and for maintaining any desired pressure on this liquid.

The invention still further comprehends the idea of providing a dispenser comprising a liquid container disposed within a casing, and means for maintaining any desired pressure on the liquid within the container, suitable valve means being provided in the discharge conduit which is operable in accordance with the pressure for controlling the flow of liquid therethrough. Such valve means in a dispenser for beer has the advantage that after the pressure on the beer has been decreased to a certain minimum amount, the valve means will operate to prevent further discharge of beer from the dispenser. This valve means, when operated in accordance with the pressure, is used in conjunction with a visible sight gauge which serves to indicate when it is necessary to again supply pressure to the beer in order to have beer in proper condition as discharge from the tap.

The present invention also includes the idea of forming a valve for the discharge means which includes a passage or conduit connected to the pressure means and communicating with a conduit or passageway adapted to discharge air or other fluid under pressure above the liquid level in the container. Such a valve in the preferred embodiment further includes locking means for locking the liquid container within the casing.

Other objects, features, capabilities and advantages are comprehended by the invention, as will later appear and as are inherently possessed thereby.

Referring to the drawings:

Figure 1 is a view in perspective of a portable dispenser made in accordance with the present invention;

Figure 2 is a view in vertical cross-section taken in a plane represented by line 2—2 of Figure 1 of the drawings;

Figure 3 is a fragmentary bottom plan view of the valve operating means;

Figure 4 is a fragmentary view in cross-section taken in the plane represented by line 4—4 of Figure 2 of the drawings and showing the main valve in its open position;

Figure 5 is a view similar to Figure 4 disclosing the valve in its closed position;

Figure 6 is a view in cross-section similar to Figure 2 of the drawings and disclosing an alternative construction; and Figure 7 is a fragmentary view in cross-section taken in the plane represented by line 7—7 of Figure 6 of the drawings and disclosing the valve in its open position.

Referring now more in detail to the drawings, an embodiment selected to illustrate the present invention is shown as comprising a casing 2 formed with inner and outer walls between which may be disposed any suitable insulating material 4. This casing 2 is closed by a cover or closure member 6 which may be formed with the spaced walls 8 and 10 between which may be disposed any insulating materials or the like, such as 4. The cover 6 may frictionally seat with the casing 2, as disclosed, in order to provide a fluid-tight joint therebetween, but the invention also comprehends the idea of using a resilient gasket or gasket of any other suitable material between the casing and cover, if it is found desirable, in order to provide a fluid-tight joint. As shown in Figure 1 of the drawings, the cover 6 is normally held in association with the casing 2 by means of a plurality of locking members 12 which may be readily operated to release the cover. This cover is suitably carried from place to place by handle 14 and is further provided with the upstanding walls 16 forming an abutment so that this cover may be used as a tray for carrying receptacles from place to place which have been filled with fluid from the device.

Disposed within the inside compartment 18 of the casing 2 is a container 20 which may be of any desired shape, although as shown this container is cylindrical and has end walls such as 22. Liquid from the container 20 is discharged exteriorly of the casing 2 by discharge means generally referred to as 24. Such discharge means comprises a tap 26 secured to the casing 2 which may be operated at will for causing flow of fluid from the container. This tap 26 is connected to a conduit or pipe 28 extending downwardly therefrom and being secured to a supporting member 30 associated or connected with the casing 2. This supporting member has a passageway or opening 32 adapted to communicate with passageway 34 of a valve member 36. Valve member 36 is disposed within a circular bore or opening 38 in supporting member 30 and seats against a washer or gasket 40, this valve member 36 being provided with a stem 42 extending through a suitable opening in supporting member 30 and casing 2 and is connected to a valve operating lever 46 by means of one or more nuts 44. This lever 46, as shown in Figure 3, is adapted to have movement between stops 48 and 50, one of which stops limits movement of lever 46 when the valve is closed and the other of which stops limits movement of this lever when the valve is opened.

The valve mechanism associated with the liquid container 20 comprises a casing 52 threaded in a valve fitting 54 connected to the container 20, this casing extending inwardly from the valve fitting 54. Fitting within the casing 52 is a valve member 56 having a frusto-conical shaped body portion to seat with a similar surface of the casing 52 in order to provide a fluid-tight joint, these surfaces being suitably ground or machined to provide this fluid-tight joint. Valve member 56 is formed with an upstanding shank 58 having a nut or abutment 60 threaded thereon in spaced relation to the end of the casing 52, a coil spring 62 being disposed between this nut 60 and the closed end of the casing 52 in order to urge this valve member 56 into a substantially close fit with the casing 52 and to prevent any leakage therebetween.

The valve mechanism associated with the container is adapted to seat upon gasket or washer 64, and when the container is inserted within the casing 2, the valve casing 52 is adapted to receive valve member 36, oppositely disposed pins 66 protruding from the valve member 36 being received in the oppositely disposed slots 68 formed in valve casing 52. The valve member 36 is further formed with non-circular projections 70 adapted to be received in a non-circular slot 72 formed in the lower end of valve member 56. The valve casing 52 is provided with an opening or passageway 74 adapted to communicate with a passage or opening 76 through the valve member 56 when the valve member 56 is in its open position. It will therefore be quite apparent that discharge through the tap 26 is effected through opening 74 in casing 52 which communicates with opening 76 in valve member 56, which in turn communicates with opening 34 in valve member 36. Opening 34 of valve member 36, when the same is in its open position, communicates with passageway 32 entering into the conduit 28 which is connected to tap 26.

As is well understood, beer is normally charged in order to be palatable and kept under pressure in order to maintain the same in charged condition until drawn. In a device of this kind particularly adapted for dispensing beer, it is therefore necessary to provide some means for applying pressure to the liquid in container 20, to compensate for decrease of pressure due to discharge of quantities of beer therefrom. Such means in the present embodiment comprises a pump generally referred to as 78, suitably mounted in casing 2 and having a handle 80 connected to a piston (not disclosed) adapted to force air into the container 20. This air is forced from the piston chamber through conduit 82 through a valve 84 and conduit 86 provided in supporting member 30. The washer 64 is formed with an opening 87 in alignment with the conduit 86, and also in alignment with a passage or conduit 88 in valve casing 52 when the container 20 is inserted in place over valve member 36. Passage or conduit 88 of valve casing 52 is adapted, when the valve member 56 is in its open position, to communicate with passage 90 in this valve member, this passage 90 leading to a conduit 92 mounted in valve member 56 and adapted to extend above the level of the liquid in the container 20.

As shown in Figure 5 of the drawings, valve member 36 has been moved into a closed position by means of the handle or lever 46, and at that time is adapted to receive the valve mechanism of the container 20, the non-circular projections 70 thereof fitting within the non-circular groove or slot 72 of the valve member 56 which is also in its closed position. At this time flow of liquid from the container 20 is prevented through opening 74 because valve 56 is in its closed position and forms a closure member for this opening. This valve member 56 also provides a closure member for preventing entrance or exit of air or the like through passageway 88. It is also to be observed that valve member 36, when closed, provides an abutment preventing the passage of fluid in conduit 32, and the gasket 40 prevents leakage of any fluid from conduit 32 or container 20 through casing 2.

As the valve mechanism of the container 20 is inserted over valve member 36, pins 66 are received within the slots 68, and as lever 46 is turned, these pins are moved into the position as shown in Figure 4 of the drawings and over cam surfaces 94, thereby drawing valve mechanism of casing 20 into closed engagement with gasket 64 to prevent leakage of any of the liquid from the container into the inner compartment of casing 2.

Movement of lever arm 46 accordingly serves to cause an interlocking between valve member 36 and container 20 and casing 52 and also serves to open valve member 56, whereby a continuous passage from the container 20 to the tap 26 is provided. Furthermore, a continuous passage is provided between the cylinder of the pump 78 to the space above the liquid in the container 20 through conduit 92.

In order to indicate the pressure existing in container 20, a visible pressure gauge 96 is attached to the casing 2 adjacent the tap 26, this pressure gauge communicating through conduit 98 with conduit 28. As shown in Figure 2 of the drawings, this gauge 96 is operated by means of the liquid in conduit 28. The present invention comprehends, if desired, any suitable diaphragm mechanism in fitting 100, or disposed in any other desired position, which may be acted upon by the liquid being discharged from container 20 for operating the pressure gauge 96, this diaphragm mechanism being particularly adapted to provide a completely sanitary device.

In order to prevent the discharge of beer through tap 26 after the pressure has decreased to a certain amount, a suitable valve 102 is provided in conduit 28, this valve being operated in accordance with the pressure above the liquid in container 20. If the pressure within the container 20 decreases to a certain amount due to drawing of beer through tap 26, this valve 102 will operate to close conduit 28 and to prevent any further discharge of beer until the pump 78 has been operated to increase the pressure to a desired amount for forcing the beer in suitable condition through the tap 26.

In Figures 6 and 7 of the drawings is disclosed an alternative construction for the present portable dispenser, the same comprising a casing 2 made in accordance with the casing of the previous embodiment, this casing being closed by means of the cover 6 and being adapted to enclose a container 20 provided with valve mechanism 104. This valve mechanism is somewhat similar to the valve mechanism heretofore described, and includes a casing 106 extending within the container 20 and threadedly engaging the valve fitting 108 secured to the casing 20. This valve casing is formed with oppositely disposed openings 110 which communicate with an opening 112 provided in a valve member 114 of frustoconical shape which engages with a similar surface of the casing 106 to provide a fluid-tight joint therebetween. This valve member 114 has a stem 116 to which a nut or abutment 118 is secured and between which and the end of the casing 106 is a coil spring 120 in order to urge the valve member 114 into tight engagement with the casing 106. Casing 106 is formed with a non-circular slot 122 adapted to receive the non-circular projections 124 of a valve member 126 corresponding in all essentials to valve member 36 of the previously described embodiments, which is mounted in a supporting member 128 associated with the casing 2 and operated by handle 46, this valve member 126 having an opening 130 communicating with opening 132 which leads to a tap 26. A gasket 134 is disposed between the valve mechanism 104 of the container and the supporting member 128, and the valve member 126 seats upon a gasket 136, these gaskets being provided to insure against leakage of any liquid into the inner compartment of casing 2 or through the casing. Valve member 126 is provided with oppositely projecting pins adapted to be received in slots of the casing 106 corresponding to pins 66 and slots 68 for locking the container in place within the casing 2 when the valve mechanism is operated or moved into open position.

A portable dispenser made in accordance with this disclosure has the sight gauge 96 communicating by way of the conduit 98 to a discharge conduit 138 corresponding to discharge conduit 28 of the previously described embodiment. The pump mechanism 78 in this embodiment, however, does not communicate with a conduit communicating through valve mechanism associated with the container, but on the other hand has a pipe or conduit 140 leading into a flexible tubing 142 which is connected to a valve 144 adjacent the top of the container 20. In this way the pressure on the liquid may be maintained by suitable operation of the pump.

As shown in Figure 1 of the drawings, a drip basin or fluid container 146 may be releasably secured in any desired manner to the casing 2 immediately below the tap 26. This fluid container 146 is normally covered by means of a removable perforated plate 148, which plate serves to support a receptacle being filled through tap 26, the openings therein being adapted to permit passage of the overflow of fluid or any drippings from tap 26 to pass therethrough into the basin 146. This receptacle 146 may be removed when desired and cleaned if necessary, or when the portable dispenser is placed within a refrigerator it may be necessary to remove this fluid container 146 in order that the dispenser may be accommodated.

While I have herein described and upon the drawings shown illustrative embodiments of the invention, it is to be understood that the invention is not limited thereto but may comprehend other constructions, arrangements of parts, details and features without departing from the spirit of the invention.

I claim:

1. A liquid dispenser comprising a casing, a liquid container disposed within said casing, and means for discharging liquid from said container, said means including a two-part valve adapted to hold said container in place within said casing, one of said parts being connected to said container and the other of said parts being connected to said casing and adapted to be moved into communication with said discharge means, and means for operating one of said parts to control the flow of liquid through said discharge means.

2. A liquid dispenser comprising a casing, a liquid container disposed within said casing, means for discharging liquid from said container, said means including a two-part valve adapted to hold said container in place within said casing, one of said parts being connected to said container and the other of said parts being connected to said casing and adapted to be moved into communication with said discharge means, and means operable from the exterior of said casing for operating said valve.

3. A liquid dispenser comprising a casing, a liquid container disposed within said casing, means for discharging liquid from said container and having a valve for controlling discharge of liquid exteriorly of said casing, said means including a valve associated with said container and casing, said valve having means for locking said container in position within said casing, and means exteriorly of said casing for operating said valve to open and close the same and to lock and unlock said container.

4. A liquid dispenser comprising a casing, a liquid container disposed within said casing, means for discharging liquid from said container and having a valve for controlling discharge of liquid exteriorly of said casing, said means including a valve associated with said container and casing, said valve comprising a valve casing connected to said container, a valve member disposed therein, and a valve member supported by said casing and interlocking with said first-named valve member for operation thereof, said last-named member and valve casing having interlocking means for holding said receptacle in position within said casing, and means operable from the exterior of said casing for operating said last-named valve member whereby said valve is open when said container is locked in position in said casing and said valve is closed when said container is unlocked in respect to said casing.

5. A liquid dispenser comprising a casing, a liquid container disposed within said casing, means for discharging liquid from said container and having a valve for controlling discharge of liquid exteriorly of said casing, said means including a valve for locking said container in place within said casing, means for maintaining a pressure above the liquid in said container, and valve means associated with said discharge means and operable in accordance with said pressure for controlling discharge of liquid through said conduit.

6. A liquid dispenser comprising a casing, a removable liquid container disposed within said casing, means for discharging liquid from said container and having a valve for controlling discharge of liquid exteriorly of said casing, a valve operable from the exterior of said casing for controlling discharge of liquid to said discharge means, means for releasably locking said container in said casing, means for maintaining a pressure above the liquid in said container, and valve means associated with said discharge means and operable in accordance with said pressure for controlling discharge of liquid through said conduit.

7. A liquid dispenser comprising a casing, a liquid container disposed within said casing, means for discharging liquid from said container and having a valve for controlling discharge of liquid exteriorly of said casing, said means including a valve associated with said container and casing, and means for maintaining a pressure above the liquid in said container, said means including a conduit extending through said valve and above said liquid.

8. A liquid dispenser comprising a casing, a liquid container disposed within said casing, means for discharging liquid from said container and having a valve for controlling discharge of liquid exteriorly of said casing, said means including a valve associated with said container and casing, means for maintaining a pressure above the liquid in said container, said means including a conduit extending through said valve and above said liquid, and valve means associated with said discharge means and operable in accordance with said pressure for controlling discharge of liquid through said discharge means.

9. A liquid dispenser comprising a casing, a removable liquid container disposed within said casing, means for discharging liquid from said container and having a valve for controlling discharge of liquid exteriorly of said casing, said means including a valve associated with said container and casing, said valve comprising means for locking said container and casing when open and for releasing the same when closed, means for operating said valve, means for maintaining a pressure above the liquid in said container, said means including a passageway through said valve and above said liquid, and valve means associated with said discharge means and operable in accordance with said pressure for controlling discharge of liquid through said discharge means.

10. In a liquid dispenser, the combination of a casing, a container disposed within said casing, and a two-part valve, one of said parts being associated with said casing and the other of said parts being associated with said container, said first-named part being rotatable for operating said valve, and a tap independent of said first-named part and having a conduit communicating with said valve.

11. In a liquid dispenser, the combination of a casing, a removable container disposed within said casing, and a two-part valve, one of said parts being connected to said casing and the other of said parts being connected to said container, said parts having means for interlocking said casing and container, said first-named part being rotatable for operating said valve, and a tap independent of said first-named part and having a conduit communicating with said valve.

12. In a liquid dispenser, the combination of a casing, a removable container disposed within said casing, a two-part valve, one of said parts being rotatively connected to said casing and the other of said parts being connected to said container, and means independent of said rotative part but having a conduit communicating therewith for discharging liquid from said container.

13. In a liquid dispenser, the combination of a casing, a removable container disposed within said casing, a two-part valve, one of said parts being rotatively connected to said casing and the other of said parts being connected to said container, said parts having means for interlocking said casing and container, and means independent of said rotative part but having a conduit communicating therewith for discharging liquid from said container.

14. In a liquid dispenser, the combination of a casing, a container disposed within said casing, a two-part valve, one of said parts being associated with said casing and the other of said parts being associated with said container, means exteriorly of said casing for operating said valve, and means associated with said casing and having a non-rotative conduit communicating with said valve for discharge of liquid from said container.

15. In a liquid dispenser, the combination of a casing, a removable container disposed within said casing, a two-part valve, one of said parts being connected to said casing and the other of said parts being connected to said container, said parts having means for interlocking said casing and container, means exteriorly of said casing for operating said valve, and means associated with said casing and having a non-rotative conduit communicating with said valve for discharge of liquid from said container.

16. In a liquid dispenser, the combination of a casing, a removable container disposed within said casing, a two-part valve, one of said parts being connected to said casing and the other of said parts being connected to said container, means connected to said first-named part for discharging liquid from said container, means exteriorly of said casing for operating said valve, and means associated with said casing and having a non-rotative conduit communicating with said valve for discharge of liquid from said container.

17. In a liquid dispenser, the combination of a casing, a removable container disposed within said casing, a two-part valve, one of said parts being connected to said casing and the other of said parts being connected to said container, said parts having means for interlocking said casing and container, means connected to said first-named part for discharging liquid from said container, means exteriorly of said casing for operating said valve, and means associated with said casing and having a non-rotative conduit communicating with said valve for discharge of liquid from said container.

18. In a liquid dispensing device, the combination of a casing, a removable container disposed within said casing, a two-part valve for discharge of liquid from said container, one of said parts being connected to said casing and the other of said parts being connected to said container, means for interlocking said valve parts to hold said container in said casing, and means for operating said valve exteriorly of said casing to effect said interlocking and simultaneous opening of said valve for discharge of liquid from said container.

H. GUSTAV LASSEN.